US012162105B2

(12) United States Patent
Khakh et al.

(10) Patent No.: US 12,162,105 B2
(45) Date of Patent: Dec. 10, 2024

(54) SPRAY CONTAINMENT SYSTEMS AND WELDING GUN NOZZLE CLEANING SYSTEMS INCLUDING SPRAY CONTAINMENT SYSTEMS

(71) Applicant: Illinois Tool Works Inc., Glenview, IL (US)

(72) Inventors: Jagdev Singh Khakh, Windsor (CA); Jeffrey G. Wells, Belle River (CA); Bradley Eugene Whipple, South Woodslee (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/889,915

(22) Filed: Aug. 17, 2022

(65) Prior Publication Data

US 2023/0061447 A1    Mar. 2, 2023

Related U.S. Application Data

(60) Provisional application No. 63/237,724, filed on Aug. 27, 2021.

(51) Int. Cl.
*B23K 9/32* (2006.01)
*B05B 12/32* (2018.01)
(Continued)

(52) U.S. Cl.
CPC .............. *B23K 9/328* (2013.01); *B05B 12/32* (2018.02); *B05B 13/0278* (2013.01); *B08B 3/02* (2013.01); *B23D 77/14* (2013.01)

(58) Field of Classification Search
None
See application file for complete search history.

(56) References Cited

U.S. PATENT DOCUMENTS 4,702,195 A * 10/1987 Thielmann ............. B23K 9/328
219/136
5,387,376 A    2/1995 Gasser
(Continued)

FOREIGN PATENT DOCUMENTS

CA    2391149    12/2002
JP    H07314142    12/1995
(Continued)

OTHER PUBLICATIONS

European Office Communication with extended Search Report Appln No. 221911440.1 dated Jan. 20, 2023.
(Continued)

*Primary Examiner* — Binu Thomas
(74) *Attorney, Agent, or Firm* — McAndrews, Held & Malloy, Ltd.

(57) ABSTRACT

An anti-spatter spray containment system includes: an enclosure having a nozzle insertion orifice on a first side and a drain orifice on a second side of the enclosure; a spray nozzle configured to spray fluid toward a nozzle inserted into the nozzle insertion orifice, wherein the enclosure is configured to funnel the fluid in a direction toward the second side; and a baffle configured to block at least a first portion of sprayed fluid from the spray nozzle from exiting the enclosure via the nozzle insertion orifice, the first side configured to block at least a second portion of the sprayed fluid from the spray nozzle that is not blocked by the baffle.

17 Claims, 5 Drawing Sheets

(51) Int. Cl.
*B05B 13/02* (2006.01)
*B08B 3/02* (2006.01)
*B23D 77/14* (2006.01)

(56) References Cited

U.S. PATENT DOCUMENTS

| | | | | |
|---|---|---|---|---|
| 6,034,351 | A * | 3/2000 | Sato | B23K 9/328 |
| | | | | 219/136 |
| 6,578,590 | B2 | 6/2003 | Leblond | |
| 2002/0066474 | A1 * | 6/2002 | White | B05B 15/555 |
| | | | | 134/179 |
| 2006/0065284 | A1 * | 3/2006 | Langeder | B23K 9/328 |
| | | | | 134/1 |
| 2006/0249498 | A1 | 11/2006 | Schaefer | |
| 2018/0015562 | A1 * | 1/2018 | Denzer | B23K 9/328 |

FOREIGN PATENT DOCUMENTS

| | | | |
|---|---|---|---|
| JP | 2013180337 | | 9/2013 |
| JP | 2013180337 | A * | 9/2013 |

OTHER PUBLICATIONS

Canadian Examiner Requisition Appln No. 3,170,788 dated Nov. 8, 2023.
European Exam Report Appln No. 22191440.1 dated Dec. 20, 2023.
Canadian Examiner Requisition Appln No. 3, 170,788 dated Oct. 22, 2024.

* cited by examiner

SPRAY CONTAINMENT SYSTEMS AND WELDING GUN NOZZLE CLEANING SYSTEMS INCLUDING SPRAY CONTAINMENT SYSTEMS

FIELD OF THE DISCLOSURE

This disclosure relates generally to robotic welding and, more particularly, to spray containment systems and welding gun nozzle cleaning systems including spray containment systems.

BACKGROUND

Welding guns may accumulate spatter or other contamination during welding operations. Welding gun nozzle cleaning systems may include reamers, anti-spatter sprayers, and/or lubricators, to improve the operational life of the welding gun nozzle.

SUMMARY

Spray containment systems and welding gun nozzle cleaning systems including spray containment systems are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
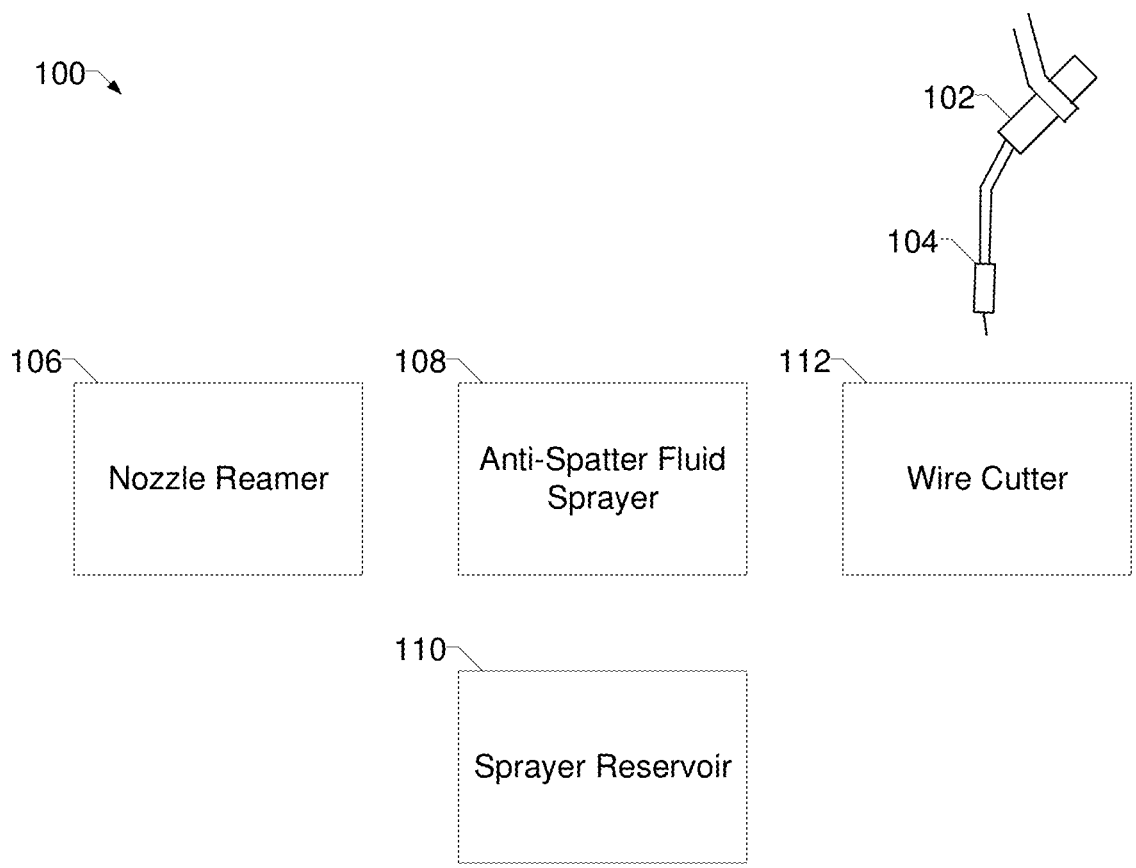
FIG. 1 is a block diagram of an example welding gun cleaning system configured to clean a welding gun, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Conventional anti-spatter fluid sprayers and spray containment systems sprayed anti-spatter fluid onto welding gun nozzles to slow the accumulation of spatter on the nozzle while reducing contamination of the weld cell by the sprayed anti-spatter fluid. Conventional sprayers and spray containment systems involved maintenance such as regular cleaning of the spray containment system to ensure performance of the spray system. Additionally, conventional spray containment systems may involve substantial manufacturing time and complexity to build.

Disclosed example anti-spatter fluid sprayers and spray containment systems reduce the maintenance involved in using anti-spatter fluid on welding nozzle cleaning systems, reduce the complexity of the spray containment systems, and/or improve the effectiveness or performance of the spray containment system. Example anti-spatter fluid sprayers and spray containment systems include an enclosure, into which a welding gun nozzle may be inserted to be sprayed with anti-spatter fluid. Some disclosed example anti-spatter fluid sprayers and spray containment systems reduce overspray, or sprayed fluid escaping the spray containment system, by including both a top plate of an enclosure and an internal baffle positioned parallel with the top plate. Each of the top plate and the internal baffle have a concentric nozzle insertion orifice configured to permit insertion of the welding gun nozzle into the enclosure, but block all or nearly all anti-spatter fluid from escaping the enclosure through the top plate or nozzle insertion orifice. Anti-spatter fluid that is not deposited onto the welding gun nozzle is funneled toward a drain port opposite the top plate.

Disclosed example anti-spatter fluid sprayers and spray containment systems provide a very low-maintenance solution to containing the overspray of anti-spatter spray, such as by substantially increasing the interval between maintenance compared with conventional spray containment devices. Disclosed example anti-spatter fluid sprayers and spray containment systems are also more robust and/or durable than conventional spray containment devices, such as by eliminating the use of o-rings at the point of nozzle insertion into the sprayer. Disclosed example anti-spatter fluid sprayers and spray containment systems may also be used with more types and/or sizes of welding nozzles than conventional spray containment devices (e.g., without having to change the size of the nozzle insertion orifice).

Disclosed example anti-spatter coating systems include: an enclosure having a nozzle insertion orifice on a first side and a drain orifice on a second side of the enclosure; a spray nozzle configured to spray fluid toward a nozzle inserted into the nozzle insertion orifice, wherein the enclosure is configured to funnel the fluid in a direction toward the second side; and a baffle configured to block at least a first portion of sprayed fluid from the spray nozzle from exiting the enclosure via the nozzle insertion orifice, the first side configured to block at least a second portion of the sprayed fluid from the spray nozzle that is not blocked by the baffle.

In some example anti-spatter coating systems, the first side of the enclosure faces upward. In some example anti-spatter coating systems, the baffle is positioned parallel to the first side. In some example anti-spatter coating systems, the baffle includes a second nozzle insertion orifice aligned with the nozzle insertion orifice of the enclosure.

In some example anti-spatter coating systems, the baffle is internal to the enclosure. In some example anti-spatter coating systems, the spray nozzle is positioned between the first side and the second side of the enclosure. In some example anti-spatter coating systems, the enclosure includes a removable cover having the nozzle insertion orifice, in which the removable cover is removable from and replaceable onto the enclosure.

In some example anti-spatter coating systems, the nozzle insertion orifice does not include a seal or o-ring. In some example anti-spatter coating systems, the baffle is positioned within the enclosure such that all direct trajectories of the fluid from the spray nozzle are blocked by at least one of the baffle, an inserted nozzle, or the enclosure.

Disclosed example welding gun nozzle cleaning systems include: a reamer configured to remove spatter from a welding gun nozzle; and an anti-spatter coating system, including: an enclosure having a nozzle insertion orifice on a first side and a drain orifice on a second side of the enclosure, the nozzle insertion orifice configured to permit insertion of the welding gun nozzle through the nozzle insertion orifice; a spray nozzle configured to spray fluid toward a nozzle inserted into the nozzle insertion orifice, wherein the enclosure is configured to funnel the fluid in a direction toward the second side; and a baffle configured to block at least a first portion of sprayed fluid from the spray nozzle from exiting the enclosure via the nozzle insertion orifice, the first side configured to block at least a second portion of the sprayed fluid from the spray nozzle that is not blocked by the baffle.

In some example welding gun nozzle cleaning systems, the first side of the enclosure faces upward. In some example welding gun nozzle cleaning systems, the baffle is positioned parallel to the first side. In some example welding gun nozzle cleaning systems, the baffle includes a second nozzle insertion orifice aligned with the nozzle insertion orifice of the enclosure.

In some example welding gun nozzle cleaning systems, the baffle is internal to the enclosure. In some example welding gun nozzle cleaning systems, the spray nozzle is positioned between the first side and the second side of the enclosure. In some example welding gun nozzle cleaning systems, the enclosure includes a removable cover having the nozzle insertion orifice, the removable cover being removable from and replaceable onto the enclosure.

In some example welding gun nozzle cleaning systems, the nozzle insertion orifice does not include a seal or o-ring. In some example welding gun nozzle cleaning systems, the baffle is positioned within the enclosure such that all direct trajectories of the fluid from the spray nozzle are blocked by at least one of the baffle, an inserted nozzle, or the enclosure.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

Disclosed example anti-spatter spray containment systems include: an enclosure having a nozzle insertion orifice on a first side and a drain orifice on a second side of the enclosure; a spray nozzle configured to spray fluid toward a nozzle inserted into the nozzle insertion orifice, wherein the enclosure is configured to funnel the fluid in a direction toward the second side; and a baffle configured to block at least a first portion of sprayed fluid from the spray nozzle from exiting the enclosure via the nozzle insertion orifice, the first side configured to block at least a second portion of the sprayed fluid from the spray nozzle that is not blocked by the baffle.

In some examples, the first side of the enclosure faces upward. In some such examples, the baffle is positioned parallel to the first side. In some examples, the baffle includes a second nozzle insertion orifice aligned with the nozzle insertion orifice of the enclosure.

In some example anti-spatter spray containment systems, the baffle is internal to the enclosure. In some example anti-spatter spray containment systems, the spray nozzle is positioned between the first side and the second side of the enclosure. In some example anti-spatter spray containment systems, the enclosure includes a removable cover having the nozzle insertion orifice, the removable cover being removable from and replaceable onto the enclosure.

In some example anti-spatter spray containment systems, the nozzle insertion orifice does not include a seal or o-ring. In some example anti-spatter spray containment systems, the baffle is positioned within the enclosure such that all trajectories of the fluid from the spray nozzle are blocked by at least one of the baffle, an inserted nozzle, or the enclosure.

Disclosed example welding gun nozzle cleaning systems include: a reamer having a nozzle cleaning bit configured to remove spatter from a welding gun nozzle; and an anti-spatter coating system having: an enclosure having a nozzle insertion orifice on a first side and a drain orifice on a second side of the enclosure, the nozzle insertion orifice configured to permit insertion of the welding gun nozzle through the nozzle insertion orifice; a spray nozzle configured to spray fluid toward a nozzle inserted into the nozzle insertion orifice, wherein the enclosure is configured to funnel the fluid in a direction toward the second side; and a baffle configured to block at least a first portion of sprayed fluid from the spray nozzle from exiting the enclosure via the nozzle insertion orifice, the first side configured to block at least a second portion of the sprayed fluid from the spray nozzle that is not blocked by the baffle.

FIG. 1 is a block diagram of an example welding gun cleaning system 100 configured to clean a welding gun 102. The welding gun 102 may be manipulated by, for example, a robotic manipulator, a collaborative robot manipulator, or manually by a welding operator. The example welding gun 102 includes a nozzle 104 which is generally subjected to spatter during welding operations, which can freeze and build up onto the nozzle 104, thereby reducing welding quality over time.

To remove spatter and/or reduce the adhesion of spatter on the welding nozzle, the example welding gun may be cleaned and/or conditioned by the welding gun cleaning system 100. The example welding gun cleaning system 100 includes a nozzle reamer 106, an anti-spatter fluid sprayer 108 coupled to a sprayer reservoir 110, and a wire cutter 112. The example welding gun cleaning system 100 may include additional accessories such as a motor lubricator, an air filter, an air regulator, and/or any other features. The welding gun 102 may be sequentially moved to positions to perform the configured gun cleaning operations.

The example nozzle reamer 106 includes a motor and a bit (e.g., a blade or other cutting device), which mechanically removes spatter and/or other contaminants from the surface of the nozzle 104 and/or a contact tip or gas diffuser on the welding gun 102.

The example anti-spatter fluid sprayer 108 sprays or otherwise deposits an anti-spatter fluid onto the interior and/or exterior of the nozzle 104 and/or other portions of the welding gun 102 that may be adversely affected by the buildup of spatter. The sprayer 108 receives anti-spatter fluid stored in the sprayer reservoir 110. As discussed in more detail below, the anti-spatter fluid sprayer 108 is configured to reduce or prevent overspray, or the escape of anti-spatter fluid into the welding environment surrounding the welding gun cleaning system 100.

The wire cutter 112 is configured to cut an electrode wire sticking out from the welding gun 102 to a consistent length and/or to have a consistent tip shape, which can improve arc starting.

Figure 2:
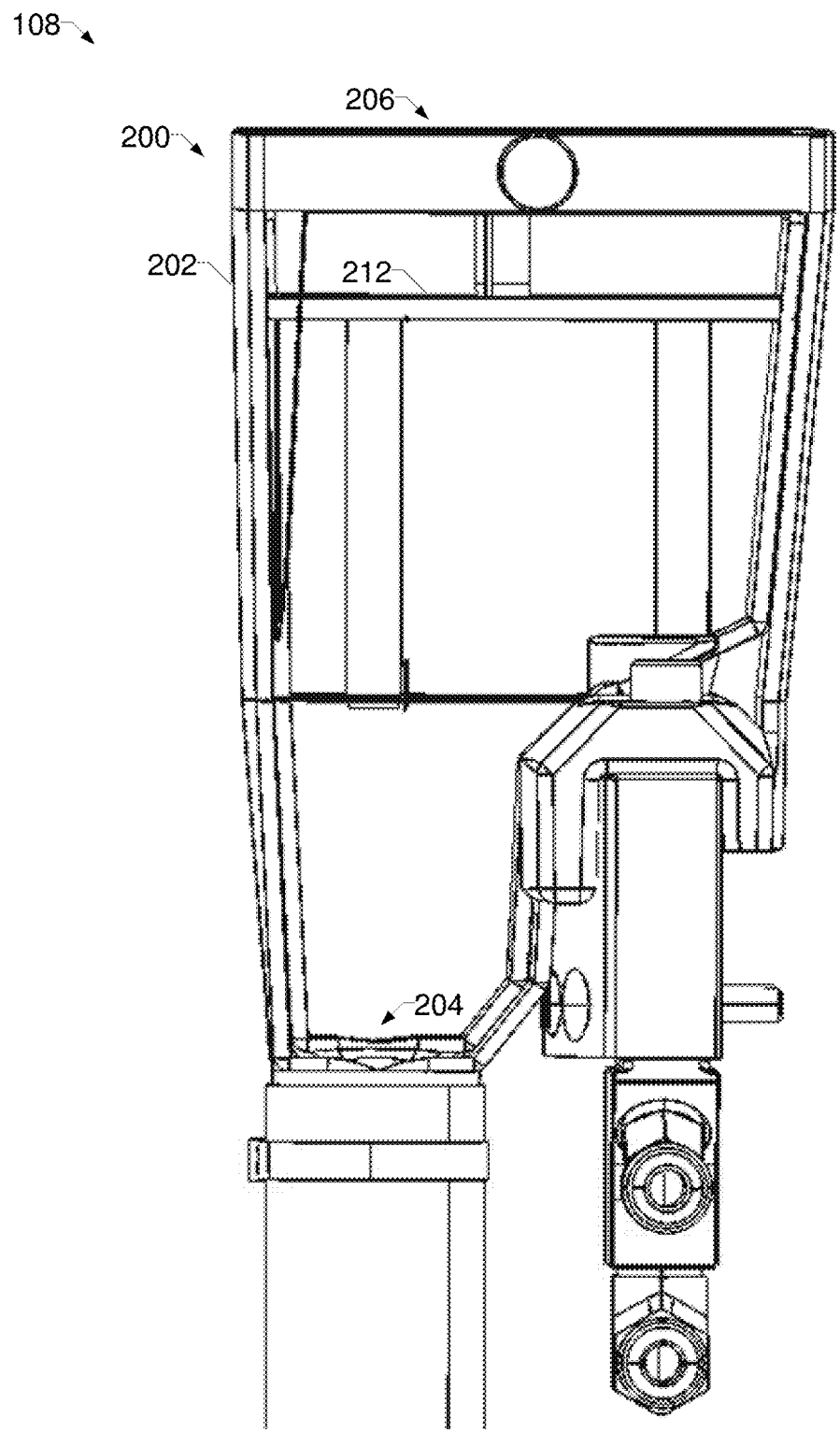
FIG. 2 is an elevation view of an example implementation of the sprayer of FIG. 1 including a spray containment system.
Figure 3:
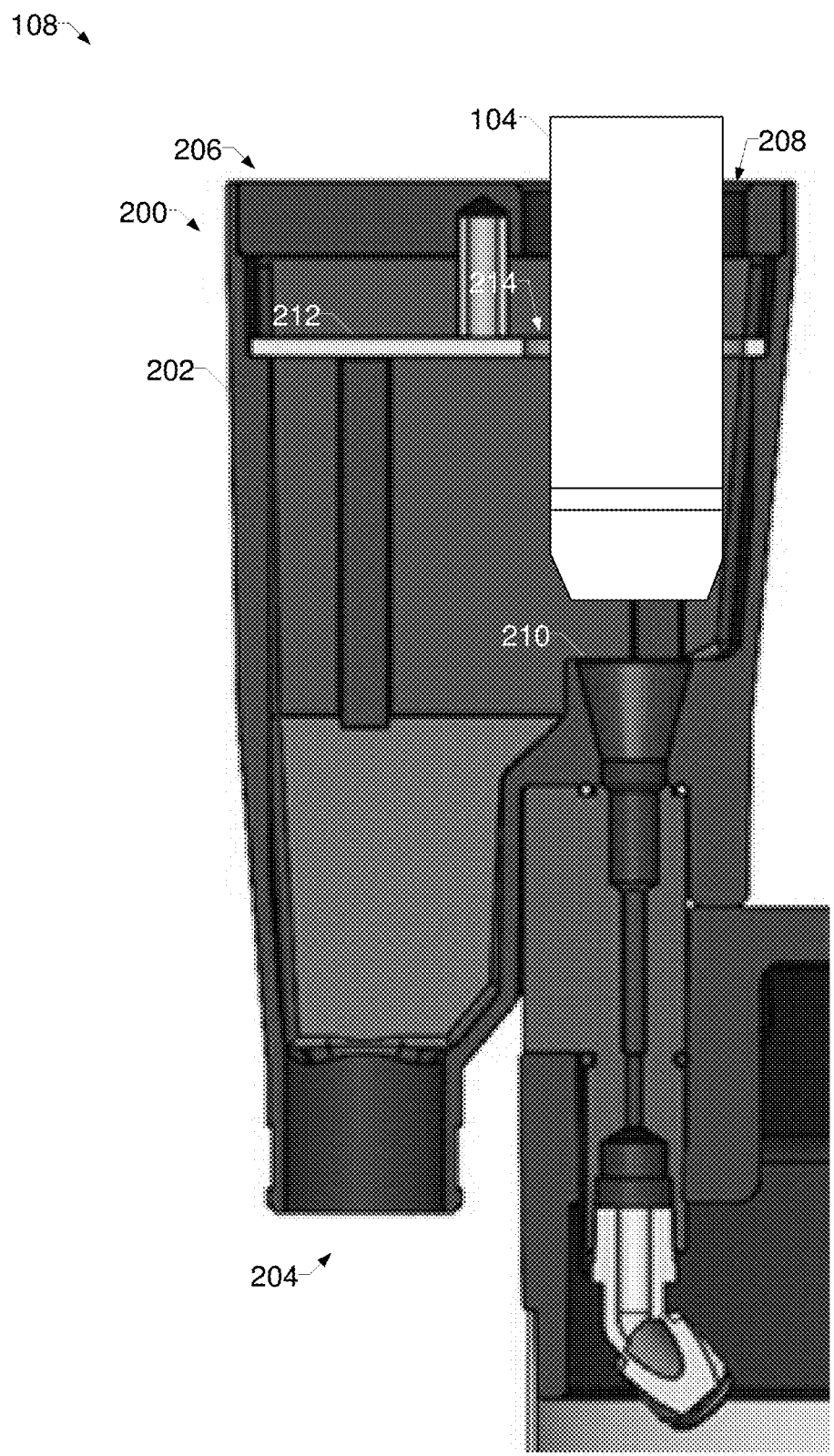
FIG. 3 is a cross-sectional elevation view of the sprayer and spray containment system of FIG. 2.
Figure 4:
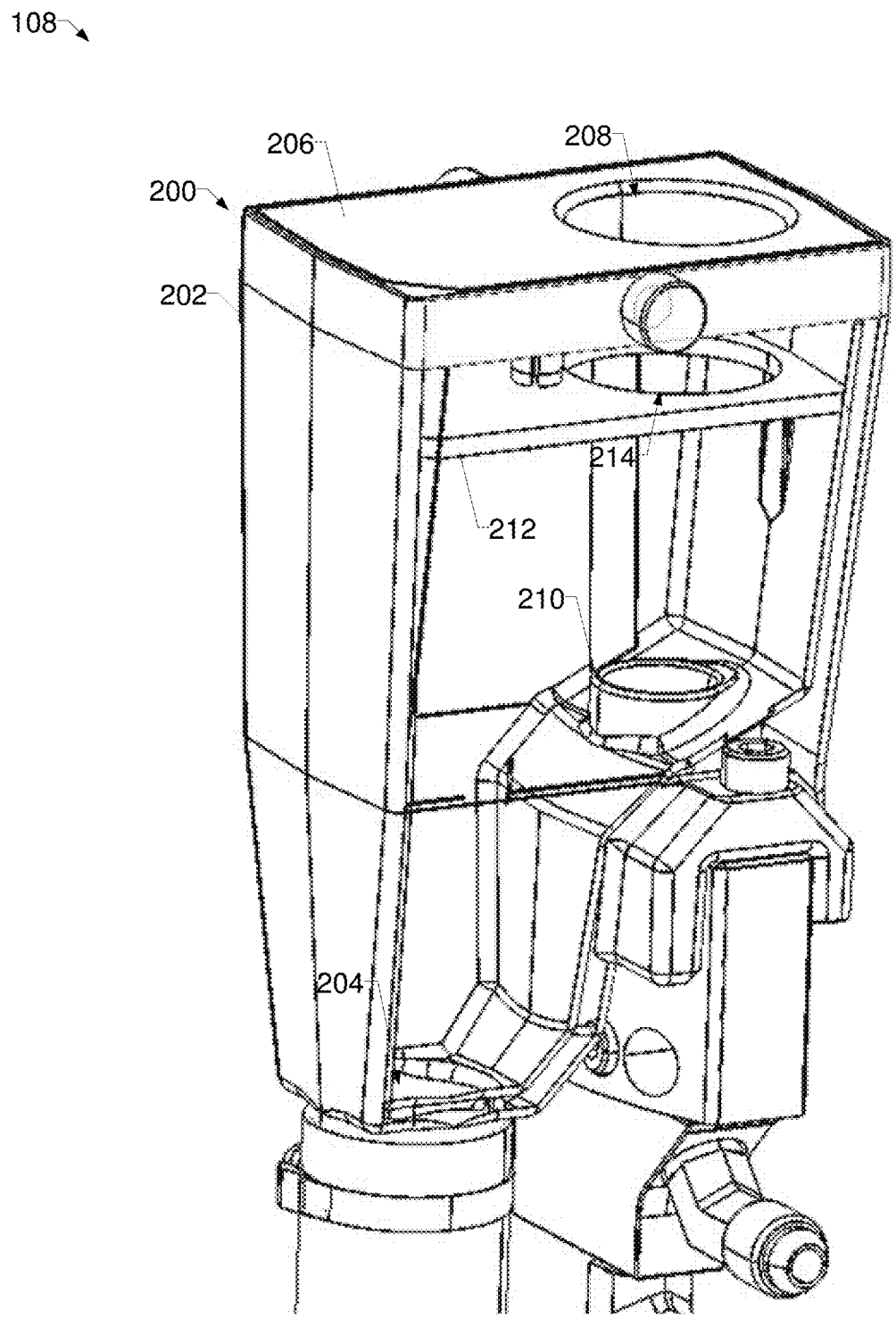
FIG. 4 is a perspective view of the sprayer and spray containment system of FIG. 2.
Figure 5:
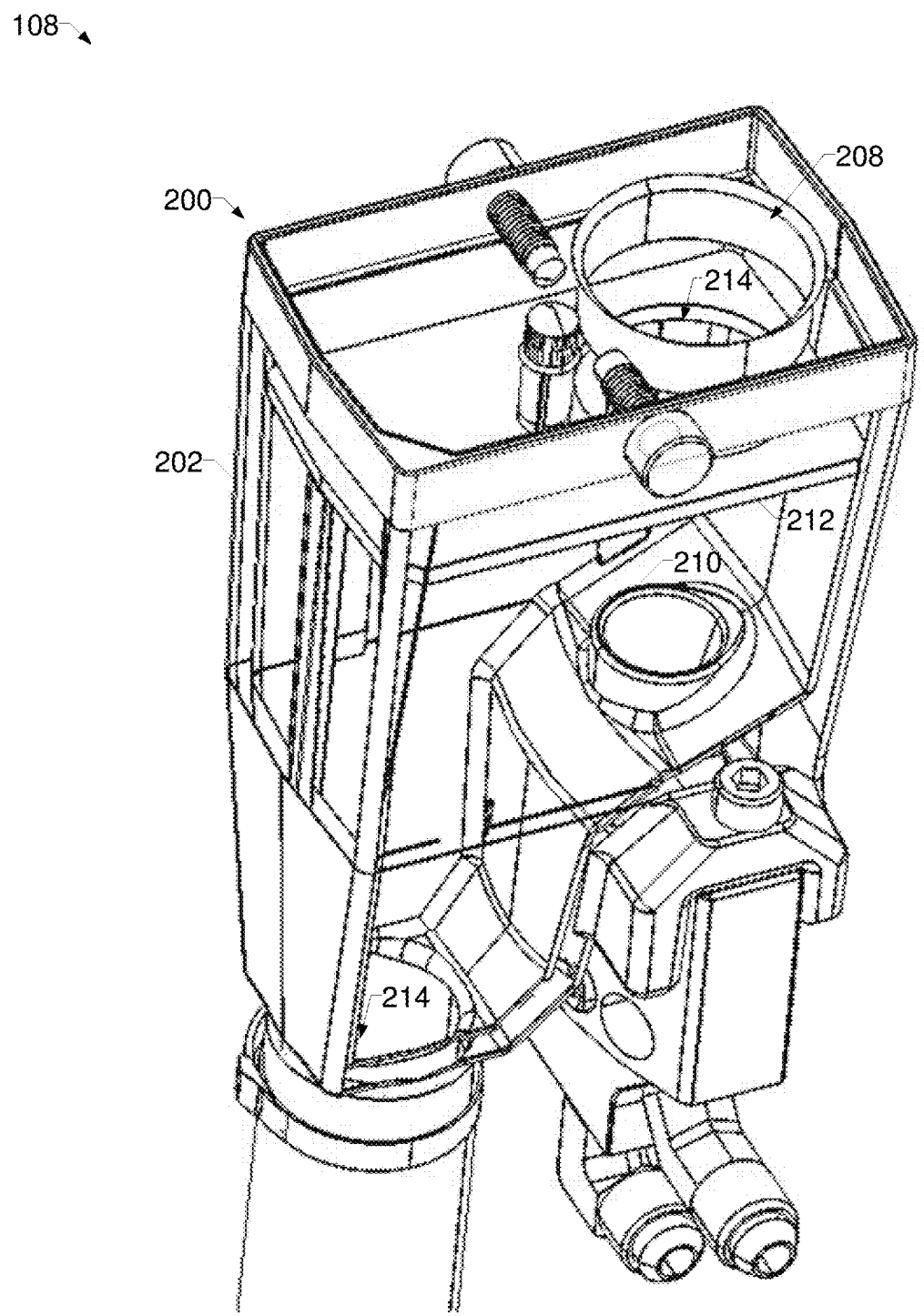
FIG. 5 is another perspective view of the sprayer and spray containment system of FIG. 2.

FIG. 2 is an elevation view of an example implementation of the sprayer 108 of FIG. 1 including a spray containment system 200. FIG. 3 is a cross-sectional elevation view of the sprayer 108 and spray containment system 200 of FIG. 2. FIG. 4 is a perspective view of the sprayer 108 and spray containment system 200 of FIG. 2. FIG. 5 is another perspective view of the sprayer 108 and spray containment system 200 of FIG. 2.

The example spray containment system 200 of FIGS. 2-5 includes an enclosure 202. The enclosure 202 may be generally funnel-shaped, in that the enclosure 202 is configured to direct fluid toward a drain orifice 204 when in the upright position as illustrated in FIG. 2. The drain orifice 204 may be connected to a drain pipe or other drainage conduit, or may be permitted to drain to a container or surface positioned below the drain orifice 204. In this regard, the spray containment system 200 may be positioned such that the drain orifice 204 does not drain onto other components of the welding gun cleaning system 100.

The drain orifice 204 is on a bottom side of the enclosure 202, which his opposite the top cover 206 of the enclosure 202.

The top cover 206 may be a removable cover that blocks (e.g., obstructs, deflects, impedes) escape of anti-spatter fluid through a top side of the enclosure 202. The top cover 206 of the enclosure 202 includes a nozzle insertion orifice 208. The nozzle insertion orifice 208 enables insertion of the nozzle 104 of the welding gun 102 into the interior of the enclosure 202. The example enclosure 202 is dimensioned to receive at least the portion of the nozzle 104 that is to be sprayed with the anti-spatter fluid.

A spray nozzle 210 of the anti-spatter fluid sprayer 108 is positioned within the enclosure 202 to spray the anti-spatter fluid toward a nozzle inserted into the nozzle insertion orifice 208. In the example of FIGS. 2-5, the nozzle 210 is positioned at a height between the top cover 206 and the bottom (e.g., the drain orifice 204) of the enclosure 202, and the enclosure 202 funnels or otherwise directs fluid from the location of the nozzle 210 toward the drain orifice 204.

The example spray containment system 200 of FIGS. 2-5 further includes a baffle 212 positioned within an interior of the enclosure 202. The baffle 212 is configured to block at least a portion of the anti-spatter fluid sprayed from the spray nozzle 210 from exiting the enclosure 202 via the nozzle insertion orifice 208 in the top cover 206. The top cover 206 is blocks additional anti-spatter fluid that is not blocked by the baffle 212.

The example baffle 212 is a plate that rests on ridges or other features within the enclosure 202, which may prevent movement of the baffle 212 upwards. In the illustrated example, the baffle 212 is positioned parallel to the top cover 206, and is secured with a dowel pressed into the bottom side of the top cover 206. The top cover 206 and the baffle 212 are easily removed for servicing or cleaning of the spray containment system 200. The baffle 212 has a nozzle insertion orifice 214 that is aligned with the nozzle insertion orifice of the top cover 206. In the illustrated example, the nozzle insertion orifices 208, 214 are not equipped or fitted with o-rings or seals. However, the baffle 212 is positioned within the enclosure 202 such that all, or substantially all, trajectories of the fluid from the spray nozzle 210 are blocked by the baffle 212, an inserted nozzle 104, or the enclosure 202 (including the top cover 206). While in some cases, small amounts of anti-spatter fluid (e.g., aerosolized particles or droplets entrained in airflow) manage to escape the spray containment system 200, the baffle 212, the top cover 206, and the spray nozzle 210 are positioned to consistently block or impede trajectories (e.g., direct, line-of-sight trajectories and/or bouncing trajectories) from the spray nozzle 210 to the exterior of the spray containment system 200. As a result, any small amounts of escaping fluid have a low velocity and have a high likelihood of settling close to or on the spray containment system (e.g., instead of other equipment in the weld cell).

In some examples, the top cover 206 and/or the baffle 212 may be configured to have drain holes and/or gaps between the top cover 206 and/or the baffle 212 to promote drainage of anti-spatter fluid that settles on top of the baffle 212 or the top cover 206 to the drain orifice 204.

In some examples, spray containment system 200 may include multiple baffles. For example, a second, third, and/or more baffles may be added in parallel to the baffle 212 (e.g., above or below the baffle 212) to further block anti-spatter fluid sprayed from the spray nozzle 210 from exiting the enclosure.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An anti-spatter coating system, comprising:
   an enclosure having a cover plate comprising a nozzle insertion orifice on a first side of the enclosure, and a drain orifice on a second side of the enclosure;
   a spray nozzle configured to spray fluid toward a nozzle inserted into the nozzle insertion orifice, wherein the enclosure is configured to funnel the fluid in a direction toward the second side; and
   a baffle plate configured to block at least a first portion of sprayed fluid from the spray nozzle from exiting the enclosure via the nozzle insertion orifice, the cover plate configured to block at least a second portion of the sprayed fluid from the spray nozzle that is not blocked by the baffle plate, and the baffle plate is internal to the enclosure and separated from the cover plate by a gap.

2. The anti-spatter coating system as defined in claim 1, wherein the first side of the enclosure faces upward.

3. The anti-spatter coating system as defined in claim 2, wherein the baffle plate is positioned parallel to the first side.

4. The anti-spatter coating system as defined in claim 3, wherein the baffle plate comprises a second nozzle insertion orifice aligned with the nozzle insertion orifice of the enclosure.

5. The anti-spatter coating system as defined in claim 1, wherein the baffle plate is internal to the enclosure.

6. The anti-spatter coating system as defined in claim 1, wherein the spray nozzle is positioned between the first side and the second side of the enclosure.

7. The anti-spatter coating system as defined in claim 1, wherein the nozzle insertion orifice does not include a seal or o-ring.

8. The anti-spatter coating system as defined in claim 1, wherein the baffle plate is positioned within the enclosure such that all direct trajectories of the fluid from the spray nozzle are blocked by at least one of the baffle plate, an inserted nozzle, or the enclosure.

9. A welding gun nozzle cleaning system, comprising:
  a reamer configured to remove spatter from a welding gun nozzle; and
  an anti-spatter coating system comprising:
    an enclosure having a cover plate comprising a nozzle insertion orifice on a first side of the enclosure, and a drain orifice on a second side of the enclosure, the nozzle insertion orifice configured to permit insertion of the welding gun nozzle through the nozzle insertion orifice;
    a spray nozzle configured to spray fluid toward a nozzle inserted into the nozzle insertion orifice, wherein the enclosure is configured to funnel the fluid in a direction toward the second side; and
    a baffle plate configured to block at least a first portion of sprayed fluid from the spray nozzle from exiting the enclosure via the nozzle insertion orifice, the cover plate configured to block at least a second portion of the sprayed fluid from the spray nozzle that is not blocked by the baffle plate, and the baffle plate is internal to the enclosure and separated from the cover plate by a gap.

10. The welding gun nozzle cleaning system as defined in claim 9, wherein the first side of the enclosure faces upward.

11. The welding gun nozzle cleaning system as defined in claim 10, wherein the baffle plate is positioned parallel to the first side.

12. The welding gun nozzle cleaning system as defined in claim 11, wherein the baffle plate comprises a second nozzle insertion orifice aligned with the nozzle insertion orifice of the enclosure.

13. The welding gun nozzle cleaning system as defined in claim 9, wherein the baffle plate is internal to the enclosure.

14. The welding gun nozzle cleaning system as defined in claim 9, wherein the spray nozzle is positioned between the first side and the second side of the enclosure.

15. The welding gun nozzle cleaning system as defined in claim 9, wherein the nozzle insertion orifice does not include a seal or o-ring.

16. The welding gun nozzle cleaning system as defined in claim 9, wherein the baffle plate is positioned within the enclosure such that all direct trajectories of the fluid from the spray nozzle are blocked by at least one of the baffle plate, an inserted nozzle, or the enclosure.

17. An anti-spatter coating system, comprising:
  an enclosure having a nozzle insertion orifice on a first side and a drain orifice on a second side of the enclosure, wherein the nozzle insertion orifice does not include a seal or o-ring;
  a spray nozzle configured to spray fluid toward a nozzle inserted into the nozzle insertion orifice, wherein the enclosure is configured to funnel the fluid in a direction toward the second side; and
  a baffle plate configured to block at least a first portion of sprayed fluid from the spray nozzle from exiting the enclosure via the nozzle insertion orifice, the first side of the enclosure configured to block at least a second portion of the sprayed fluid from the spray nozzle that is not blocked by the baffle plate.

* * * * *